(12) United States Patent
Kumar et al.

(10) Patent No.: US 9,569,375 B2
(45) Date of Patent: Feb. 14, 2017

(54) UNIFYING CLASS DEVICE INTERFACE WITH ONE HOST INTERFACE BY USING EMBEDDED CONTROLLER

(71) Applicant: Microchip Technology Incorporated, Chandler, AZ (US)

(72) Inventors: Ravindra Kumar, St. James, NY (US); Jayavasanth Vethamanickam, Hauppauge, NY (US); Arun Krishnan Mundan Vilakath, Central Islip, NY (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 87 days.

(21) Appl. No.: 14/709,739

(22) Filed: May 12, 2015

(65) Prior Publication Data

US 2015/0331830 A1 Nov. 19, 2015

Related U.S. Application Data

(60) Provisional application No. 62/000,089, filed on May 19, 2014.

(51) Int. Cl.
*G06F 13/00* (2006.01)
*G06F 13/10* (2006.01)
(Continued)

(52) U.S. Cl.
CPC ......... *G06F 13/102* (2013.01); *G06F 13/4282* (2013.01)

(58) Field of Classification Search
CPC .................................. G06F 13/00; G06F 9/00
(Continued)

(56) References Cited

U.S. PATENT DOCUMENTS 5,938,738 A * 8/1999 Mu-Teng ................ G06F 9/543
710/41
6,138,180 A * 10/2000 Zegelin ................. G06F 13/102
710/11
(Continued)

FOREIGN PATENT DOCUMENTS

WO 98/36363 A1 8/1998 ........... G06F 13/423

OTHER PUBLICATIONS

WMD Article: "Windows Driver Model (WDM) Device Drivers", Internet Citation 1999, XP007902524, pp. 14, Jun. 16, 1999.
(Continued)

*Primary Examiner* — Christopher Shin
(74) *Attorney, Agent, or Firm* — Slayden Grubert Beard PLLC (57) ABSTRACT

A system, device and method for communicating between a host device and a plurality of peripheral devices wherein the communications utilize a single interface that is supported by the host. The host includes a plurality of class drivers and miniport drivers. Each of the class drivers implements functionality associated with one or more of the plurality of peripheral devices. Each miniport driver provides an interface by which one or more of the class drivers communicate with one or more of the plurality peripheral devices using class protocols, wherein the miniport drivers communicate through a single host interface supported by the host. An embedded controller interfaces with the plurality of peripheral devices using the respective native bus protocols of the peripheral devices and wherein the embedded controller interfaces with the plurality of miniport drivers using the single host interface.

20 Claims, 3 Drawing Sheets

(51) Int. Cl.
*G06F 13/42* (2006.01)
*G06F 9/00* (2006.01)

(58) Field of Classification Search
USPC .................................. 719/321; 710/305, 62
See application file for complete search history.

(56) References Cited

U.S. PATENT DOCUMENTS

| | | | |
|---|---|---|---|
| 6,684,260 B1* | 1/2004 | Foster | G06F 13/102 715/810 |
| 7,159,223 B1* | 1/2007 | Comeau | G06F 12/0292 711/E12.014 |
| 7,249,201 B1* | 7/2007 | Mahmoud | G06F 13/102 710/62 |
| 8,464,238 B1* | 6/2013 | Chakraborty | H04L 67/1097 709/220 |
| 2004/0088718 A1* | 5/2004 | Sprague | G06F 9/4411 719/322 |
| 2004/0098521 A1 | 5/2004 | Lin | 710/72 |
| 2005/0138191 A1* | 6/2005 | Seto | H04L 29/06 709/230 |
| 2007/0005997 A1* | 1/2007 | Kardach | G06F 1/325 713/300 |
| 2007/0198996 A1* | 8/2007 | Chiu | G06F 9/4411 719/321 |
| 2007/0294460 A1 | 12/2007 | Huang | 710/315 |
| 2012/0246377 A1 | 9/2012 | Bhesania et al. | 710/313 |

OTHER PUBLICATIONS

International Search Report and Written Opinion, Application No. PCT/US2015/031379, 13 pages, Jul. 24, 2015.

* cited by examiner

UNIFYING CLASS DEVICE INTERFACE WITH ONE HOST INTERFACE BY USING EMBEDDED CONTROLLER

CROSS-REFERENCE TO RELATED APPLICATIONS

This application claims the benefit of U.S. Provisional Application No. 62/000,089 filed on May 19, 2014, which is incorporated herein in its entirety.

TECHNICAL FIELD

The present disclosure relates to peripheral device communications with a host device via a single host interface.

BACKGROUND OF THE INVENTION

With the advent of the personal computer, there has been a steady proliferation in the variety of human interface devices (HIDs) that provide mechanisms for human users to provide input and receive output from computer programs executing on a host device. As the capabilities of the personal computer have advanced, so has the variety and sophistication in peripheral HIDs that are available to users. This has resulted in many different hardware and software interfaces for communicating between peripheral devices and a host device.

The set of software interfaces that are utilized by a host device in supporting communications with peripheral devices are typically organized as stacked layers of interfaces. Each layer in the stack is comprised of software programs that implement a particular aspect of the functionality required for the operation of the peripheral device by the host device. The bottom layers of the stack are software programs that interface the processor of the host device with hardware buses that are used to transmit signals to and from the peripheral devices. The top layers of the stack are software programs that provide an interface by which human users or other software programs can operate the peripheral devices.

When a new peripheral device is installed for use by a host device, part of that installation processes includes verifying whether the stack of the host device includes all software necessary to communicate with the new peripheral device. In many cases, this installation process requires at least some updates to the software stack to include device-specific software that is required to fully utilize the new peripheral device. Installing device-specific software does not always address all compatibility issues. In order for the host device to interface with the new peripheral device, the host device must support the low-level bus communication protocol that is required by the peripheral device. Support for a bus communication protocol by a host device usually requires a hardware-level bus implementation that is ideally implemented when the host device is designed and manufactured.

Early generations of peripheral HIDs, which included devices such as keyboards and mice, interfaced with the host device using serial ports. Many of these early, serial port HIDs communicated with the processor of the host device via a Low Pin Count (LPC) bus. Support for the LPC bus is typically implemented on the host device by dedicated pins on the host device processor. Other bus protocols can be similarly implemented at the hardware-level of the host device. Host devices manufacturers choose which bus-protocols to support at the hardware level, which dictates whether the host device will be compatible with certain peripheral devices.

As new types of peripheral HIDs have entered the marketplace, the LPC bus serial interface used by peripherals gave way to new peripheral device interfaces. However, the resulting growth in the number of proprietary interfaces used by peripheral HIDs became untenable for host device manufacturers to support. Largely in response to this quandary, a consortium of hardware and software manufactures developed the Universal Serial Bus (USB), which provides a standardized interface for peripherals devices to communicate with a host device. USB was quickly adopted throughout the industry and has further encouraged the proliferation in peripheral HIDs.

Despite the popularity of USB, the hardware interfaces and bus protocols utilized by peripheral devices have continued to evolve. New interfaces continue to be introduced and existing interfaces are adapted for use by new classes of peripherals. In some cases, only software updates are required to support a new interface. For instance, efforts to further standardize peripheral device communications have resulted in the new peripheral device interfaces. The HID-USB protocol standardizes HID communications using the USB protocol. The HID-I2C protocol similarly standardizes HID communications using the I2C protocol. As long as a host device includes hardware support for the USB and I2C bus protocols, the host device can support peripheral devices that utilize the HID-USB or HID-I2C protocols through updates to the host device's software stack.

In other cases, new peripheral interfaces will require hardware support by the host device. For instance, as sensors continue to be adopted as components of peripheral devices, new interfaces (such as I2C) are being used by this relatively new class of peripheral devices. eSPI is a new interface replacing LPC as a single host interface to the embedded controller (EC). As with other bus protocols, support for the eSPI bus is ideally implemented by dedicating processor pins of the host device to implement this eSPI bus, in addition to including the software necessary to implement the eSPI bus protocol.

Host device manufacturers must remain forward-looking in deciding whether to include hardware support for new bus protocols that are used by new classes of peripheral devices. Legacy peripheral devices place similar pressures on host device manufacturers. The need to continue to provide support for popular peripheral devices often compels host device manufacturers to continue supporting legacy hardware interfaces. Thus, host device manufacturers face pressure to include support for emerging bus protocols used by new peripheral devices while still maintaining support for legacy bus protocols. Furthermore, host device manufactures must remain adaptable in seamlessly supporting updates to existing bus protocols. Updates to the software interfaces available for use by a host device are relatively easy to accomplish when compared to updates to hardware-level interfaces. For instance, updating a class device driver to support new peripheral device functionality is relatively easy for a host device to support versus adding support for a new bus protocol, such as eSPI. Accordingly, there is a need for a host device that can utilize existing bus protocol hardware to support new bus protocols that would otherwise require additional hardware support by the host device.

SUMMARY OF THE INVENTION

In order to alleviate the burden on host devices to provide support for all popular peripheral device interfaces, a need exists for a mechanism by which the host can communicate with peripheral device while only using a single protocol, all while allowing the peripheral devices and their associated software to continue to operate using their respective native communication protocols. The need also exists for this mechanism to be configurable in order to add support for new peripheral device protocols.

According to embodiments, a system for communicating between a host and a plurality of peripheral devices is provided. The host includes a plurality of class drivers and miniport drivers. Each of the class drivers implements functionality associated with one or more of the plurality of peripheral devices. Each miniport driver provides an interface by which one or more of the class drivers communicate with one or more of the plurality peripheral devices using class protocols, wherein the miniport drivers communicate through a single host interface supported by the host. An embedded controller interfaces with the plurality of peripheral devices using the respective native bus protocols of the peripheral devices and wherein the embedded controller interfaces with the plurality of miniport drivers using the single host interface Another embodiment comprises a bus controller driver on the host, wherein the bus controller driver implements a first portion of the single host interface and wherein the bus controller driver interfaces with the miniport drivers using a selective subset of the respective native bus protocols of the one or more of the plurality of peripheral devices; and a bus controller on the host, wherein the bus controller implements a second portion of the single host interface and wherein the bus controller interfaces with the embedded controller using the single host interface. In another embodiment, the first portion of the single host interface implemented by the bus controller driver implements the bus management processes needed to communicate using the single host interface. In another embodiment, the second portion of the single host interface implemented by the bus controller implements the bus transactions needed to communicate using the single host interface. In another embodiment, the embedded controller comprises firmware that implements the single host interface and uses the single host interface to communicate with the bus controller. In another embodiment, the information used by the host to interoperate with the plurality of peripheral devices is communicated between the host and the embedded controller using the single host interface and wherein the information used by the host to interoperate with the plurality of peripheral devices is communicated between the embedded controller and the plurality of peripheral devices using the respective native bus protocols of the plurality of peripheral devices. In another embodiment, the single host interface is an interface selected from the group consisting of: eSPI (Enhanced Serial Peripheral Interface), LPC, a serial interface, I2C interface, USB interface, SPI interface, and CAN interface.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DETAILED DESCRIPTION

Operation of a peripheral device using a host device requires ensuring compatibility of the peripheral device with the software and hardware interfaces provided by the host device. In many cases, determining hardware compatibility is only a matter of ascertaining whether the host device supports the type of hardware bus required by the new peripheral device. In many instances, hardware compatibility is determined when the host device and the peripheral device are designed and manufactured. In some instances, a host device may be modified by re-configuring general purpose hardware in order to support new peripheral devices. If a peripheral device is determined to be compatible with the hardware interface provided by a host device, software compatibility can then be ascertained.

From a software perspective, compatibility requires that the host device execute the software that is necessary to operate the peripheral device. As described, most host device systems typically organize this software into stacked layers of interfaces. Each layer provides a specialized set of services used to implement the supported communication pathways between the host device and compatible peripheral devices. Supporting new peripheral devices requires ensuring that the correct software interfaces are available at each layer of the stack. In some cases, existing libraries already in use by the host device are adequate for supporting a new peripheral device. In other cases, updates software programs in one or more levels of the stack are required.

In conventional systems, the highest layer in the stack is comprised of application software programs. These device-specific programs provide an interface, which may include a user-interface, by which the features and functionality provide by peripheral device are operated. Operating in the layer below the application software are device driver programs that implement the low-level instructions that implement the features provided by the application software. Most systems rely on class device driver programs that provide standardized libraries of driver programs that can be used to operate a variety of peripheral programs of a specific type. For instance, a HID class USB driver will include common functionality for interoperating with HIDs using the USB protocol. A similar HID class I2C driver can implement the same common HID functionality using the I2C protocol. Certain device-specific capabilities of a peripheral device may not be supported by class drivers. These scenarios may require that miniclass driver programs also be installed in order to implement device-specific functionality. The miniclass driver is configured to interoperate with the class driver, with the miniclass driver providing device-specific functionality and the class driver providing general functionality.

Below the class drivers are software programs that implement the communication protocols by which the host device communicates with the peripheral device. These lower level layers include bus protocol drivers and bus controller programs. Each bus protocol driver implements the instructions for communicating with a peripheral device via a specific bus protocol, such as USB and I2C. A bus controller implements the instructions for actually transmitting data along one of the supported hardware buses. Together, these two layers implement the bus protocols used to transmit information between a host device and peripheral devices. In conventional systems, the host device must provide a hardware implementation in support of a bus protocol. In some cases, these protocols are implemented using dedicated pins in order to interface the bus used by the protocol with the host device processor. Since these bus protocols implementations are often hardware dependent, new bus protocols cannot be readily supported by a host device.

Figure 1:
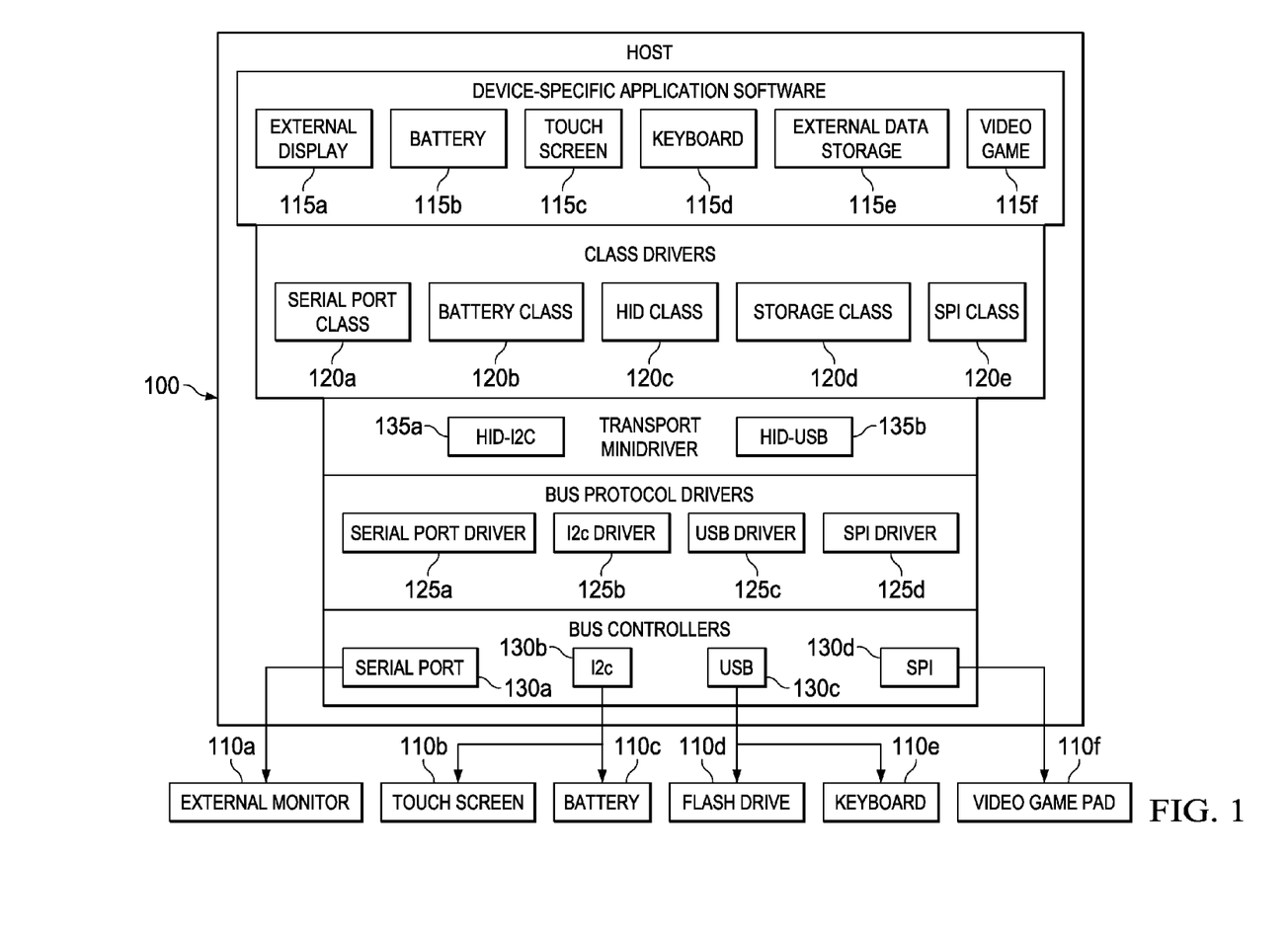
FIG. 1 is a block diagram illustrating a stacked set of software interfaces utilized by a conventional host device for supporting communications with a set of peripheral devices.

FIG. 1 illustrates a typical system of stacked interfaces utilized in a conventional host device 100 in order to support communications with a set of peripheral devices 110a-f. In a conventional system, supporting a marketable variety of peripheral devices places a significant burden on the host device 100. The host device 100 must be designed and manufactured such that it supports a diverse set of hardware and software interfaces in order to provide robust compatibility with a marketable variety of peripheral devices. As described, this compatibility must be forward-looking such that the capabilities of the host device 100 can be updated in response to the adoption of new technologies in the peripheral marketplace. The compatibility must also be backward looking in order for the host device 100 to continue providing support for popular legacy devices.

At the top layer in the conventional system of FIG. 1, application software 115a-f provides an interface to the features and functionality provided by the peripheral devices 110a-f. In some instances, this application software 115a-f may provide an interface by which the host device 100 allows a human user to interact with the peripheral devices 110a-f. In other instances, the application software 115a-f may provide only a software interface. The remaining of the stacked layers illustrated in FIG. 1 is utilized by host device 100 in order to link the application software 115a-f to the peripheral devices 110a-f.

The stacked layers illustrated in the conventional system of FIG. 1 allow the host device 100 to support communications with peripheral devices via a range of communication protocols. The touchscreen software supporting a touchscreen HID 115e executes on the CPU of the host device and communicates via I2C with a peripheral touchscreen HID 110b. Software for implementing features of a keyboard 115d receives inputs from a peripheral USB keyboard 110e. The host device 100 also executes external display software 115a that communicates with an external monitor 110a via a serial port interface. Host device 100 also executes a battery monitor software program 115b that interfaces via I2C with an external battery 110c. Host device 100 also executes software supporting external data storage 115e that interfaces with a USB flash drive 110d. Host device 100 also executes video game software 115f that interfaces via a Serial Peripheral Interface (SPI) with a peripheral video gamepad 110f.

In the conventional system depicted in FIG. 1, in order for the host device 100 to provide support for each of the peripheral devices 110a-f, the host device 100 also utilizes layers of components such as class drivers 120a-f, transport minidrivers 135a-b, bus protocol drivers 125a-d and bus controllers 130a-d. Each of these layers implements aspects of the lower-level communication protocols used by peripheral devices 110a-f. For instance, in support of a serial port peripheral device such as external monitor 110a, the external display software 115a running on the host device 100 invokes a component such as serial port class driver 120a that provides the external display software 115a with a high-level, serial port software interface. This serial port class driver 120a implements serial port communications functions that are commonly utilized by monitors. The serial port class driver 120a, in turn, invokes a component such as a serial port driver 125a to manage the serial port connection and the transmission of data via the serial port. The serial port driver 125a relies on a component such as a serial port bus controller 130a to manage the actual transactions on the serial port bus, by which data is transmitted to and from the external monitor 110a.

In a similar fashion, the conventional system of FIG. 1 also includes support for other peripheral interfaces. For peripherals designed to communicate using the I2C protocol, the host device 100 relies on a component such as an I2C driver 125b in order to manage I2C connections between the host device and peripheral devices such as the HID touchscreen 100b and external battery 110c. Supporting these I2C peripherals further requires the host device 100 to include a component such as an I2C bus controller for managing data transactions on the I2C bus.

The touch screen software 115c running on the host device 100 invokes a component such as a HID class driver 120a that provides the touch screen software 115c with a high-level, HID class interface. This HID class driver 120c implements HID protocol communication functions that are commonly utilized by HID protocol based peripheral devices. The HID class driver 120c, in turn, invokes a component such as a HID-I2C transport minidriver 135a, which implements the communication functions utilized by HID class devices using the I2C protocol. The HID-I2C transport minidriver 135a, in turn, invokes the I2C driver 125b to manage I2C connections and transmission of data via I2C bus.

Class drivers may implement common functionality using multiple communication protocols. The host device 100 utilizes various class interfaces that are capable of operating the I2C driver 125b. In the system of FIG. 1, the battery class driver 120b and the HID class driver 120c provide the ability to utilize the I2C protocol via the I2C driver 125b. The battery class driver 120b implements functions commonly employed by peripheral battery devices. The HID class driver 120c implements functions commonly used by HIDs and supports both the I2C and USB communication protocols using the HID-I2C and HID-USB transport minidrivers 135a-b. In some host devices, two separate HID class drivers may used, each one supporting a different communication protocol.

Similarly, the conventional host device 100 includes a component such as a USB driver 125c for managing connections to USB-enabled peripheral devices, such as USB flash drive 110d and USB keyboard 110e. The USB driver 125c relies on HID-USB transport minidriver 135b, which implements the communication functions utilized by HID class devices using the USB protocol. Supporting these USB peripherals further requires the host device 100 to include a component such as a USB bus controller 130c for managing transactions on the USB bus. The host device 100 utilizes various class drivers to operate the USB driver 125c, with each class driver implementing common USB functionality used by different types of peripheral devices. Storage class driver 120d implements common functionality used by peripheral storage devices and the HID class driver 120c implements common functionality used by various types of HIDs.

The conventional host device 100 also includes a SPI driver 125d for managing connections to SPI-enabled devices, such as the video gamepad 110f. In order to provide support for the video gamepad 110f, the host executes gamepad software 115f that invokes a component such as an SPI class driver 120a that provides a high-level SPI software interface. The SPI class driver 120a implements common SPI functionality used by peripheral game pad devices. The SPI class driver relies on a component such as the SPI driver 125d for managing connections to SPI-enabled devices. The SPI driver 125d relies on a component such a SPI bus controller 130d for managing the actual transactions on the SPI bus.

As described above, an ideal host device is able to support both popular current and legacy protocols and also remain adaptable to include future protocols. As the number of peripheral devices that are supported by a host device increases, so does the complexity of the stacked layers of interfaces used to support the peripheral devices. As these stacked layers increase in complexity, effectively managing updates to components of the stack becomes increasingly difficult due to the many interdependencies that develop within the stacked layers. Addressing these demands, embodiments of the invention provide the ability for a host device to interface with a range of peripheral devices that utilize different communication protocols through a single interface.

Figure 2:
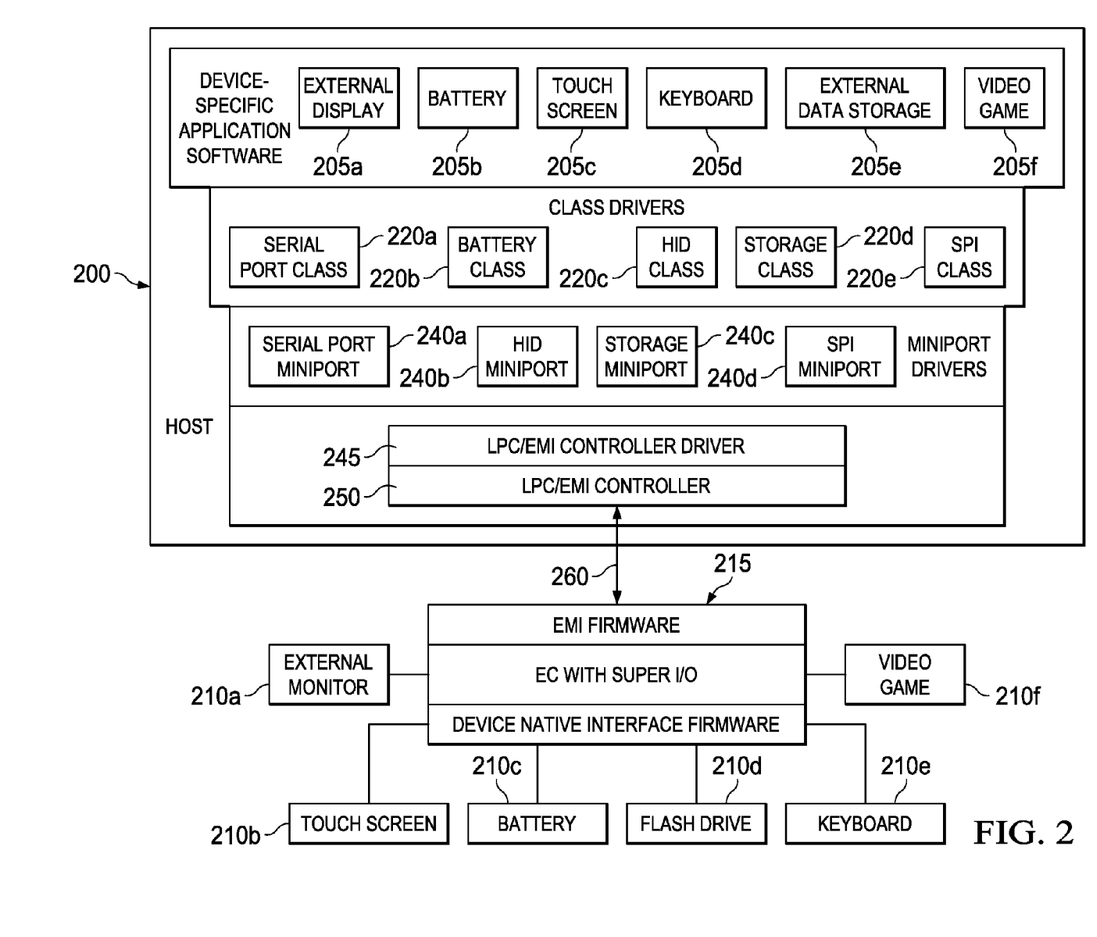
FIG. 2 is a block diagram illustrating a stacked set of software interfaces utilized by one embodiment of a host device for supporting communications with a set of peripheral devices.

One of various embodiments is illustrated in FIG. 2. According to the embodiment of FIG. 2, each of the peripheral devices described with respect to FIG. 1 connect to the host device 200 through a single host interface 260. The host device 200 relies on an embedded controller (EC) 215 to interface with each of the peripheral devices 210a-f. The embedded controller 215 is configured to interface with each of the peripheral devices 210a-f through each peripheral device's native interface and to interface with the host device 200 through the single host interface 260. Per this configuration, bus-level transactions with each of the peripheral devices 210a-f are managed by the embedded controller 215 on behalf of the host device 200.

With all bus-level transactions funneled through the interface between the host device 200 and the embedded controller 215, the host device does not need to support any other hardware interfaces in order support the peripheral devices 210a-f. In the embodiment of FIG. 2, the single host interface 260 is implemented using the LPC hardware interface. Other embodiment may utilize other hardware interfaces as the single host interface 260. For instance, other embodiments may implement the single host interface using eSPI (Enhanced Serial Peripheral Interface Bus), I2C or a PCI hardware interface. Some embodiments may provide the ability to configure the hardware interface that is used as the single host interface.

Regardless of the hardware interface that is used as the single host interface 260, this selection is transparent to the peripheral devices 210a-f. Each of the peripheral devices 210a-f communicates with the host device 200 using the same native bus interface as in a conventional system. For instance, external monitor 210a still communicates with host device using the same serial port interface used in a conventional system. However, instead of interfacing directly with a hardware interface provided by the processor of the host device, the peripheral devices 210a-f interface with a hardware interface provided by the embedded controller 215. The application software programs 205a-f associated with each of the peripheral devices 210a-f are also unaffected by use of a single host interface 260 by the embedded controller 215. Each application software program 205a-f communicates with its corresponding peripheral device 210a-f using the same class drivers 220a-c and any miniclass drivers used in the conventional system of FIG. 1. As a result, the functionality provided by the peripheral devices 210a-f is unaffected by the embedded controller 215 serving as an intermediary that bridges the low-level bus transactions with the peripheral devices 210a-f.

In the conventional system of FIG. 1, the communication protocols are implemented using software components such as bus protocol drivers 125a-d and bus controllers 130a-b. Each of the bus protocol drivers 125a-d implements a software interface corresponding to one of the hardware bus protocols that is supported by host device 100. For instance, the host device 100 executes an I2C driver 125b, which provides a software interface by which the host device 100 communicates with I2C devices such as external battery 110c and touchscreen 110b. These bus protocol drivers 125a-d implement the I2C instructions that are invoked by the host device 100 in order to communicate with I2C peripheral devices.

The hardware bus controllers 130a-b of the conventional system of FIG. 1 are software programs utilized by the host device 100 in order to implement the individual bus-level transactions needed to communicate with peripheral devices according to their supported native bus protocol. These bus controller programs provide the instructions for actually transmitting data on the individual buses that are supported by the host device. The bus controller programs implement the bus transactions used by all devices that utilize that particular protocol. For instance, I2C bus controller 130b implements the low-level software used to transmit data on the physical I2C bus and mediates access to the I2C bus on behalf of all peripheral devices that are communicating with the host device 100 via I2C. In the conventional system of FIG. 1, both the HID touchscreen 110b and the battery device 110c communicate with the host device 100 via the I2C bus controller 130b.

Determining whether a new peripheral device can be operated by host device 100 in a conventional system requires ensuring that all of the software programs necessary to operate the new peripheral device are installed and accessible to the host device 100. For instance, when installing the USB keyboard 110e for use by the personal computer, all of the software necessary for operating the keyboard by the host device 100 must be installed on the personal computer. The device-specific application software 115d that provides features of the keyboard must be installed. A suitable class driver 120c for operating keyboard devices must be identified in the class driver libraries of the personal computer or otherwise must be installed. Software programs implementing the USB protocol must also be installed or identified. A device-specific USB driver 125c must be installed that implements the USB communications necessary to operate the keyboard. A transport minidriver 135b to interface the class driver 120c and the device-specific USB driver must also be installed or identified. And, a general purpose USB bus controller 130c must be identified, or otherwise installed.

In the embodiment of FIG. 2, the same application software 205a-f and class drivers 220a-e are used as in the conventional system of FIG. 1. Consequently, the modifications required to convert a conventional system to an embodiment are transparent to the application software 205a-f and class drivers 220a-e. The peripheral devices 210a-f are also unchanged. From the perspective of the peripheral devices 210a-f and the application software 205a-f and class drivers 220a-e executing on the host device 200, no changes are apparent since the native interface being used to communicate between these components is unchanged from a conventional host device. For instance, the USB HID keyboard 210e and the corresponding application software 205d and class driver 220c still invoke the USB protocol to communicate between them. However, rather than transport minidrivers 135a-b, device-specific bus protocol drivers 125a-d and bus controllers 130a-d present in the conventional system of FIG. 1, embodiments instead utilize miniport drivers 240a-d and a single controller driver 245 and a single bus controller 250 for implementing a single host interface by which all peripheral devices will communicate with the host device 200.

According to embodiments, components such as miniport drivers 240a-d are used in conjunction with class drivers 220a-e. The miniport drivers 240a-d implement the communications used by the class drivers 220a-e. Miniport drivers 240a-d implement the communications functions used by a class of devices and are configured to interoperate with the bus-level communications functions provided by the controller driver 245. For instance, in the embodiment of FIG. 2, the HID miniport driver 240 implements communications used by HID class devices and is configured to forward these communications to the embedded controller 215 using the bus communication protocol implemented by the controller driver 245 and the controller 250. Communications received by the controller 250 are then translated from the protocol of the single host interface 260 to the native protocol used by the peripheral devices 210a-f. The analogous translations are made by these components for communications originating at the peripheral devices 210a-f and flowing to the application software 205a-f. In this manner, the miniport drivers 240a-d serve as bridge on the host device 200 between the class specific protocol like the HID-protocol and the native bus protocol utilized by the peripheral devices through the single bus protocol that is implemented by the host device 200.

Similar to the bus protocol drivers 125a-d and the bus controllers 130a-d of the conventional host device in FIG. 1, the controller driver 245 and the controller 250 implement the bus communications for host device 200. However, rather than implement every bus protocols that are deemed necessary by the designers of the host device 200, the controller driver and 245 and the controller 250 implement a single bus protocol. In the embodiment of FIG. 2, this single bus protocol is LPC, but can be any other communication protocol that can be supported by the host device 200 and the embedded controller 215. Regardless of the bus protocol that is actually implemented, the ability of the host device 200 to rely on the single host interface 260 to communicate with all peripherals means that the host device 200 need only implement hardware support for the single bus protocol utilized by the single host interface 260. In some embodiments, this single host interface may be configurable. Such embodiments still benefit from only having to support a limited number of bus protocols, rather than the universe of bus protocols required by the set of peripheral devices that will be supported by the host device.

Embodiments also benefit from maintaining full control of the bus communication between the peripherals and the host device processor. Certain bus protocols require proper bus mastering by components that utilize the bus. Even though the bus protocol required by a peripheral may be supported by the host device, differences in low level aspects of the bus communications, such as bus mastering, can result in error conditions and/or inefficient operation of this communication link. Since the bus controllers 130a-d and the bus protocol drivers 125a-d in a conventional system potentially interface directly with a variety of peripherals, updates to these components must ensure that backwards compatibility is maintained. Thus, updates to the software of these bus protocol layers that are made in order to accommodate a new peripheral device can be difficult to implement effectively. Consequently, a host device benefits by having to support bus communications with only the embedded controller, which is better suited to accommodating any such incongruities in the low level bus protocol implementations that may be used by different peripheral devices.

In order for the use of a single host interface 260 by the host device 200 to be transparent to the peripheral devices 210a-f, the host device relies on embedded controller 215 to bridge bus transactions with the peripheral devices 210a-f. In some embodiments, the embedded controller is comprised of three main components. One of these components is the firmware used to implement the bus transactions using the bus protocol chosen for the single host interface 260. In the embodiment of FIG. 2, the firmware of the embedded controller 215 communicates with the processor of the host device 200 using an LPC bus supported in the host device 200 hardware. The firmware transmits communications between the peripheral devices 210a-f and the host device 200, but bridges the communications using the bus protocol utilized by the single host interface 260.

The embedded controller 215 of the embodiment of FIG. 2 is further comprised of a super I/O component. This super I/O component translates between the native bus protocol communications used by the device native interface firmware and the bus protocol utilized by the single host interface 260. The super I/O component need not process the actual information transmitted between the host and of the peripheral device and instead need only translate the protocol used to transmit these communications. In some embodiments, the super I/O component of the embedded controller 215 communicates with the host device 200 using a memory/mailbox interface that is supported by the processor of the host device 200.

The embedded controller 215 of the embodiment of FIG. 2 is further comprised of device native interface firmware. The device native interface firmware implements the communications with the peripheral devices 210a-f according to their native bus protocol. This firmware implements the bus transactions for each of the bus protocols that are supported on behalf of the host device 200. New bus protocols can be supported by updating this firmware, without affecting the host device 200 and thus does not require updates to the hardware interfaces of the host device 200. In some embodiments, the device native interface firmware of the embedded controller 215 may implement a set of generic and device-specific class drivers configured to support bus transactions in the native bus protocols used by the peripheral device 210a-f.

Figure 3:
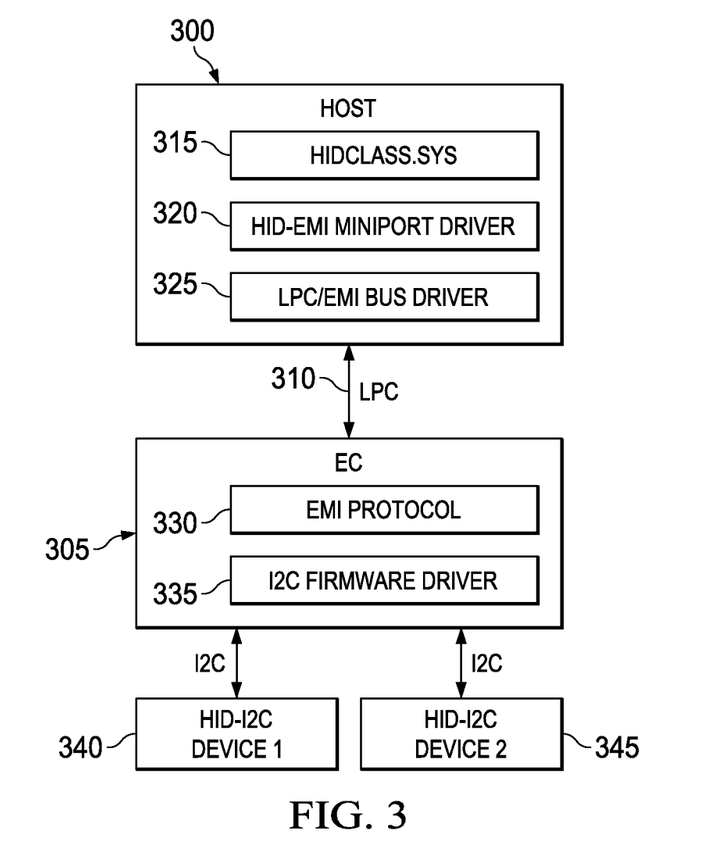
FIG. 3 illustrates a software and firmware stack utilized by an embodiment that supports communications with I2C HIDs over a single host interface.

FIG. 3 illustrates the software and firmware stack for an embodiment that supports communications with HID devices that utilize the I2C using LPC as a single host interface. In the embodiment of FIG. 3, the host device 300 executes an HID class driver 315 that implements HID functionality for use by the host. In some embodiments, the HID class driver 315 will implement functionality by which a user can interact with supported HID peripheral devices 340 and 345. In other embodiments, the HID class driver 315 will only implement functionality used by the host 300 to interoperate with supported HID peripheral devices 340 and 345.

The HID class driver 315 interfaces with an HID-EMI miniport driver 320 in order to communicate with the peripheral HID devices 340 and 345. The HID-EMI miniport driver 320 communicates with the HID class driver using class specific HID protocol utilized by the HID devices 340 and 345. The HID-EMI miniport driver 320 translates these HID protocol communications to the LPC/EMI bus protocol 310 that is used as the single host interface that is supported by the host device 300. The HID-EMI miniport driver 320 interfaces with the LPC/EMI bus driver 325, which implements the LPC/EMI bus protocol 310 used as the single host interface used by the host device 300.

On the embedded controller 305, the LPC/EMI protocol is implemented in firmware 330. The firmware component 330 transmits the translated peripheral device communications between the host and the embedded controller by interfacing with the LPC/EMI bus driver 325 of the host device 300. Also executing on the embedded controller 305, an I2C firmware driver 335 interfaces with the peripheral devices 340 and 345 in the native I2C bus protocol.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure. Accordingly, the scope of the present disclosure should be determined by the following claims and their legal equivalents.

What is claimed is:

1. A system for communicating between a host and a plurality of peripheral devices, the system comprising:
  a plurality of class drivers on the host, wherein each of the class drivers implements functionality associated with one or more of the plurality of peripheral devices;
  a plurality of miniport drivers on the host, wherein each miniport driver provides an interface by which one or more of the class drivers communicate with one or more of the plurality peripheral devices using class protocols, wherein the miniport drivers communicate through a single host interface supported by the host; and
  an embedded controller that interfaces with the plurality of peripheral devices using the respective native bus protocols of the peripheral devices and wherein the embedded controller interfaces with the plurality of miniport drivers using the single host interface.

2. The system according to claim 1, further comprising:
  a bus controller driver on the host, wherein the bus controller driver implements a first portion of the single host interface and wherein the bus controller driver interfaces with the miniport drivers using a selective subset of the respective native bus protocols of the one or more of the plurality of peripheral devices; and
  a bus controller on the host, wherein the bus controller implements a second portion of the single host interface and wherein the bus controller interfaces with the embedded controller using the single host interface.

3. The system according to claim 2, wherein the first portion of the single host interface implemented by the bus controller driver implements the bus management processes needed to communicate using the single host interface.

4. The system according to claim 2, wherein the second portion of the single host interface implemented by the bus controller implements the bus transactions needed to communicate using the single host interface.

5. The system according to claim 2, wherein the embedded controller comprises firmware that implements the single host interface and uses the single host interface to communicate with the bus controller.

6. The system according to claim 1 wherein information used by the host to interoperate with the plurality of peripheral devices is communicated between the host and the embedded controller using the single host interface and wherein the information used by the host to interoperate with the plurality of peripheral devices is communicated between the embedded controller and the plurality of peripheral devices using the respective native bus protocols of the plurality of peripheral devices.

7. The system according to claim 1, wherein the single host interface is an interface selected from the group consisting of: eSPI (Enhanced Serial Peripheral Interface), LPC, a serial interface, I2C interface, USB interface, SPI interface, and CAN interface.

8. A device for communicating with a plurality of peripheral devices, the device comprising:
  a plurality of class drivers, wherein each of the class drivers implements functionality associated with one or more peripheral devices of the plurality of peripheral devices;
  a plurality of miniport drivers, wherein each miniport driver provides an interface by which one or more of the class drivers communicate with the one or more peripheral devices using class protocols, wherein the miniport drivers communicate through a single host interface supported by the host; and
  an embedded controller that interfaces with the plurality of peripheral devices using the respective native bus protocols of the peripheral devices and wherein the embedded controller interfaces with the plurality of miniport drivers using a single host interface.

9. The device according to claim 8, further comprising:
  a bus controller driver, wherein the bus controller driver implements a first portion of the single host interface and wherein the bus controller driver interfaces with the miniport drivers using a selective subset of the respective native bus protocols of the one or more peripheral devices; and
  a bus controller, wherein the bus controller implements a second portion of the single host interface and wherein the bus controller interfaces with the embedded controller using the single host interface.

10. The device according to claim 9, wherein the first portion of the single host interface implemented by the bus controller driver implements the bus management processes needed to communicate using the single host interface.

11. The device according to claim 9, wherein the second portion of the single host interface implemented by the bus controller implements the bus transactions needed to communicate using the single host interface.

12. The device according to claim 9, wherein the embedded controller comprises firmware that implements the single host interface and uses the single host interface to communicate with the bus controller.

13. The device according to claim 8, wherein the single host interface is an interface selected from the group consisting of: eSPI (Enhanced Serial Peripheral Interface), LPC, a serial interface, I2C interface, USB interface, SPI interface, and CAN interface.

14. A method for communicating between a host and a plurality of peripheral devices, the method comprising:

providing functionality associated with the plurality of peripheral devices wherein the functionality is provide on the host by a plurality of class drivers;

transmitting first communications between the plurality of class drivers and the plurality of peripheral devices, wherein the first communications implement the peripheral device functionality on the host and wherein the first communications are transmitted by a plurality of miniport drivers using class protocols;

transmitting second communications between the plurality of miniport drivers and an embedded controller, wherein the second communications are transmitted using a single host interface; and transmitting third communications between an embedded controller and the plurality of peripheral devices, wherein the third communications are transmitted using the respective native bus protocols of the plurality of peripheral devices.

15. The method according to claim 14, wherein the second communications are transmitted via a bus controller driver that implements a first portion of the single host interface; and via a bus controller that implements a second portion of the single host interface.

16. The method according to claim 15, wherein the first portion of the single host interface implemented by the bus controller driver implements the bus management processes needed to communicate using the single host interface.

17. The method according to claim 15, wherein the second portion of the single host interface implemented by the bus controller implements the bus transactions processed needed to communicate using the single host interface.

18. The method according to claim 15, wherein the embedded controller comprises firmware that implements the single host interface and uses the single host interface to communicate with the bus controller.

19. The method according to claim 14, further comprising transforming the first and third communications that utilize the class protocols and the respective native bus protocols of the plurality of peripheral devices into the third communications that utilize the single host interface.

20. The method according to claim 14, wherein the single host interface is selected from the group consisting of: a serial interface, I2C interface, USB interface, SPI interface, and CAN interface.

* * * * *